United States Patent
Kocher et al.

(10) Patent No.: US 11,253,936 B2
(45) Date of Patent: Feb. 22, 2022

(54) RECIPROCATING SAW BLADE FOR A MACHINE TOOL

(71) Applicant: Robert Bosch GmbH, Stuttgart (DE)

(72) Inventors: Martin Kocher, Solothurn (CH); Urs Karlen, Stalden (CH); Damian Brantschen, St. Niklaus (CH); Daniel Grolimund, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 16/487,263

(22) PCT Filed: Dec. 8, 2017

(86) PCT No.: PCT/EP2017/082064
§ 371 (c)(1),
(2) Date: Aug. 20, 2019

(87) PCT Pub. No.: WO2018/153530
PCT Pub. Date: Aug. 30, 2018

(65) Prior Publication Data
US 2020/0016672 A1  Jan. 16, 2020

(30) Foreign Application Priority Data
Feb. 24, 2017 (DE) .................. 10 2017 203 031.3

(51) Int. Cl.
*B23D 61/12* (2006.01)
(52) U.S. Cl.
CPC .......... *B23D 61/121* (2013.01); *B23D 61/128* (2013.01)
(58) Field of Classification Search
CPC . B23D 61/123; B23D 61/121; Y10T 83/9319; Y10T 83/935; Y10T 83/936; Y10T 83/9348
See application file for complete search history.

(56) References Cited

U.S. PATENT DOCUMENTS

| 72,983 | A | * | 1/1868 | Davis | ................... | B23D 61/121 |
| | | | | | | 83/848 |
| 336,739 | A | * | 2/1886 | Parker | .................. | B23D 61/121 |
| | | | | | | 83/848 |

(Continued)

FOREIGN PATENT DOCUMENTS

| CN | 202895281 U | 4/2013 |
| CN | 203957042 U | 11/2014 |

(Continued)

OTHER PUBLICATIONS

International Search Report corresponding to PCT Application No. PCT/EP2017/082064, dated Feb. 7, 2018 German and English language document) (8 pages).

*Primary Examiner* — Stephen Choi
(74) *Attorney, Agent, or Firm* — Maginot, Moore & Beck LLP (57) ABSTRACT

A reciprocating saw blade for a machine tool, in particular a jigsaw blade, includes a first row of saw teeth and a second row of saw teeth. The first and second rows of saw teeth are arranged at an angle to a longitudinal axis of the reciprocating saw blade. The angle of the first row of saw teeth opposes the angle of the second row of saw teeth. The reciprocating saw blade also includes a further row of saw teeth arranged between the first and second rows of saw teeth. The further row of saw teeth is set back, in particular suddenly set back, towards the longitudinal axis in relation to the first and second rows of saw teeth.

19 Claims, 3 Drawing Sheets

(56) References Cited

U.S. PATENT DOCUMENTS

| | | | | |
|---|---|---|---|---|
| 735,586 | A | * | 8/1903 | Rabie .................. B23D 61/121 |
| | | | | 83/850 |
| 2001/0006017 | A1 | * | 7/2001 | Osada .................. B23D 61/128 |
| | | | | 83/697 |
| 2008/0201964 | A1 | | 8/2008 | Camargo et al. |

FOREIGN PATENT DOCUMENTS

| | | |
|---|---|---|
| DE | 10 2007 039 240 A1 | 2/2009 |
| EP | 2 777 856 A1 | 9/2014 |
| GB | 03536 A | 12/1898 |
| GN | 101745700 A | 6/2010 |
| GN | 101784359 A | 7/2010 |
| GN | 104043872 A | 9/2014 |

* cited by examiner

RECIPROCATING SAW BLADE FOR A MACHINE TOOL

This application is a 35 U.S.C. § 371 National Stage Application of PCT/EP2017/082064, filed on Dec. 8, 2017, which claims the benefit of priority to Serial No. DE 10 2017 203 031.3, filed on Feb. 24, 2017 in Germany, the disclosures of which are incorporated herein by reference in their entirety.

BACKGROUND

The disclosure relates to a reciprocating saw blade for a power tool such as, for example, a jigsaw blade or saber saw blade.

Such a reciprocating saw blade is known from DE 10 2007 039 240 A1. The reciprocating saw blade, in the form of a jigsaw blade, has a first and a second row of saw teeth, which are arranged at an angle to each other. Both the first and the second row of saw teeth are at an angle with relative to the stroke axis, or longitudinal axis, of the reciprocating saw blade, the angle of the first row of saw teeth being oriented oppositely to the angle of the second row of saw teeth.

SUMMARY

The disclosure is based on a reciprocating saw blade for a power tool, in particular a jigsaw blade. The reciprocating saw blade has a first row of saw teeth and a second row of saw teeth, wherein the first and second row of saw teeth are at an angle with respect to a longitudinal axis, or stroke axis, of the reciprocating saw blade. The angle of the first row of saw teeth is oriented oppositely to the angle of the second row of saw teeth.

It is proposed that a further row of saw teeth be arranged between the first and second row of saw teeth. The further row of saw teeth is set back, in particular set back in a stepwise manner, toward the longitudinal axis relative to the first and second row of saw teeth. Thus, in the direction of the longitudinal axis, or stroke axis, of the saw blade, the saw blade has at least three saw teeth portions. The longitudinal axis extends between the shank and the tip of the saw blade, and runs at least centrally through the shank. The sequence of the saw teeth portions, in the direction of the longitudinal axis of the saw blade, starting from the shank, to the tip of the reciprocating saw blade, is preferably as follows: firstly, the first row of saw teeth, followed by the further row of saw teeth, and then finally the second row of saw teeth. The first, second and further row of saw teeth each have saw teeth having saw-tooth tips. The saw-tooth tips of the further row of saw teeth are thus set back, in particular set back in a stepwise manner, from the saw-tooth tips of the first and second row of saw teeth, with respect to the longitudinal axis. The distance of the saw-tooth tips of the further row of saw teeth from the longitudinal axis of the reciprocating saw blade is thus less than the least distance of at least one saw-tooth tip of the first and second row of saw teeth. The longitudinal axis, or stroke axis, of the saw blade is deliberately selected here as a reference quantity, since a back of the saw blade may in part run obliquely in relation to the longitudinal axis of the saw blade. In principle, however, the set-back may also be referred to as an offset toward the back of the saw blade, in particular when the back of the saw blade is also oriented parallel to the direction of the stroke axis. Owing to the set-back, further row of saw teeth, when the reciprocating saw blade is being used for sawing, upon transition from the first or second row of saw teeth to the further row of saw teeth (during an upward and/or downward stroke), in particular in an abrupt manner, the material removal volume is reduced (with otherwise constant parameters, such as: constant stroke rate, constant guide motion of the reciprocating saw over the workpiece in the sawing direction, constant workpiece parameters). In addition, the receiving volume for sawdust is increased in the region of the further row of saw teeth (chip space is increased). It is advantageous advantageous, however, to render possible at least a reduced removal of material, or sawing, in the region of the further row of saw teeth (see further below), in particular by the choice of the magnitude, or distance, of the set-back of the further row of saw teeth from the longitudinal axis in relation to the distance of the adjacent first and second rows of saw teeth from the longitudinal axis. Moreover, the set-back, in particular the change in material-removal volume resulting therefrom, is effected in a region of the reversal point of the stroke movement (upper and lower dead point) that is important for the quality of cut. This is to be illustrated using the example of a jigsaw performing work on a wooden workpiece. Relative to a workpiece surface on which the handheld power tool is supported, via the foot plate, the reciprocating saw blade is in an upward or return movement toward the handheld power tool. The saw teeth of the second row of saw teeth cut and/or detach and/or tear sawdust, in particular intensified by the angular (positive) broaching position (angle of the second row of saw teeth in relation to the longitudinal axis) from the lower workpiece surface into the workpiece. The saw teeth of the first row of saw teeth (which, as described further below, has, in particular, saw teeth oriented toward the tip of the saw blade) that has an angular (negative) broaching position relative to the upward movement (cf. angle of the first row of saw teeth in relation to the longitudinal axis, or, in other words, the distance of the first saw teeth of the first row of saw teeth from the longitudinal axis decreases, starting from the shank, toward the further row of saw teeth), cut and/or detach and/or tear at least hardly any sawdust from the upper surface facing toward the power tool (but do transport already detached sawdust from this surface; key word, chip removal). Owing to the, in particular, step-wise set-back of the further row of saw teeth, cutting and/or detaching and/or tearing of sawdust is additionally avoided, or at least reduced. Moreover, the set back additionally reduces tears at the surface, facing toward the power tool, of a, for example, thinner workpiece. In the case of thinner workpieces, the saw blade can be drawn out of the workpiece (in the region of the upper dead point, or reversal point), to beyond a dividing plane of the saw blade, such that a region of the further row of saw teeth, having saw teeth that (on a side of a dividing of the saw blade that faces toward the tip) are oriented toward the shank, can come into contact with the upper workpiece surface. Owing to the set-back, however, the cutting, detaching and/or tearing effect is reduced, such that, even in the case of thin workpieces, tears can be reduced. Altogether, the quality of cut can thus be improved. The number and severity of unwanted, so-called workpiece tears, in particular at the workpiece surface (both at the upper and the lower workpiece surface) is reduced.

Scrappage of material can be avoided, and sawing from underneath, or from opposite the visible surface (as often used by professionals when sawing with jigsaws, to circumvent the problem) can be avoided. This improves the handling, or working, of workpieces with the saw blade according to the disclosure, and renders the working process more pleasant and convenient.

Further, it is proposed that the further row of saw teeth be arranged on a straight line, in particular on a straight line parallel to the longitudinal axis. The saw teeth, in particular the saw-tooth tips of the saw teeth of the further row of saw teeth, are thus arranged on a straight line (as viewed from a side view toward the blade face). It could also be said that the saw-tooth tips of the further row of saw teeth span a plane or, in particular, are arranged on a saw-tooth tip plane. In principle, saw teeth of reciprocating saw blades may be profiled and/or offset, such that the tips can in part be arranged in a transversely offset manner in relation to the lateral faces of the reciprocating saw blade. The term straight line has therefore been chosen here for simplification. However, the further row of saw teeth, or saw-tooth tips, may also be arranged in a concave or convex row, such that they do not lie on a straight line, or the saw-tooth tips do not come to lie in a saw-tooth tip plane. Advantageously, production is simplified by the straight arrangement of the further row of saw teeth. The chip space can be enlarged in a constant manner. The quality of cut is improved; a reduced susceptibility to tearing is achieved.

It is additionally proposed that the first and the second row of saw teeth be each arranged on a straight line. Here, also, it is the case that the saw teeth, in particular the saw-tooth tips, of the saw teeth of the first and second row of saw teeth each come to lie on a straight line (as viewed from a side view toward the blade face), or each come to lie on a plane formed by the saw-tooth tips of the first, or second, row of saw teeth; in particular, on a respectively associated saw-tooth tip plane. However, the first and second row of saw teeth, or their saw-tooth tips, may also be arranged in a concave or convex row, or in another manner.

Advantageously, production is simplified by the straight arrangement. Constantly progressive (aggressive) or degressive sawing can be achieved, in particular, because of, respectively, the positive or negative broaching position. This results in a steadying of the cutting motion and the cut guidance, and thus also of the handling of the reciprocating saw blade. The sawing progress and the quality of cut are improved.

It is additionally proposed that the set-back, with respect to a so-called pitch of at least first and/or second and/or further saw teeth, of the corresponding rows of saw teeth, be between 10% and 35%, in particular between 15% and 30%, particularly preferably 25%. Relative to a width of the saw blade transversely in relation to the longitudinal axis and substantially parallel to the lateral face of the saw blade (not the thickness of the saw blade), the set-back may have a ratio of 1% to 20%, in particular 3% to 16.5%. Relative to a maximum width of the saw blade, the ratio is be preferably 3.4% to 6.8%, particularly preferably about 5.7%. Relative to a minimum width of the reciprocating saw blade, in particular in the region of the dividing plane of the reciprocating saw blade (for example, of a curved saw blade according to FIG. 5), the ratio is preferably 4.9% to 9.8%, in particular about 8.2%. The choice of set-back (see also above) can decisively affect the quality of cut in the region of the stroke reversal point, and thus decisively control, in particular improve, the quality of cut. Since the set-back region has saw teeth, this region also contributes to sawing, or removal of material. The aforementioned choice of size of the set-back achieves the result that the further row of saw teeth can contribute less, but still appreciably, to the progress of sawing. (A reference for no longer appreciable is a non-toothed saw blade portion). As a result, the quality of cut is improved perceptibly (by touch) and/or visibly (fewer tears) at the workpiece surfaces (upper side and underside) and, in particular, good sawing progress can nevertheless be achieved. An optimum can be achieved, in respect of a saw blade that is selected by way of example and described in greater detail in the description of the figures, with the particularly preferred values.

Furthermore, it is proposed that the first and/or second row of saw teeth have/has opposing directions of cutting. This means that the saw teeth, in particular the saw-tooth tips of the saw teeth of the first row of saw teeth, point in opposite directions to the second row of saw teeth, in particular in the opposite direction of cutting. In other words, the saw-tooth tips of the first row of saw teeth point toward the tip of the reciprocating saw blade, and/or the saw-tooth tips of the second row of saw teeth point toward the shank of the reciprocating saw blade. A relief angle typically comprises 30° to 45° in an opposite direction, in particular both relief angles are about 35°. Advantageously, workpiece tears at the respective workpiece surface (upper side and underside; or both potential visible surfaces) are reduced significantly as a result. The quality of cut is improved considerably. Upon the upward stroke toward the reciprocating saw, sawing is effected substantially by the second row of saw teeth, with respect to the parting plane of the saw blade; upon the downward stroke, sawing is effected substantially by the first row of saw teeth. (In particular, sawing, cutting, detaching and/or tearing is/are effected by the flanks of the saw teeth). The sawdust detaching motion is effected into the workpiece, and thus prevents workpiece parts from being torn out of the surface. The rounded (blunt), non-profiled backs of the respective saw teeth of the opposite row of saw teeth, in this example of the first row of saw teeth, which emerge from the workpiece upon the upward stroke, typically do not cause any surface tearing. Moreover, at most they contribute only to an insignificant degree to the progress of sawing; rather, they merely release previously sawn sawdust (chip ejection).

Furthermore, it is proposed that the further row of saw teeth have saw teeth of an opposing direction of cutting. These are advantageously arranged with mirror symmetry in relation to the dividing plane that runs in the longitudinal centre of, and normal to, the longitudinal axis, relative to the longitudinal extent of the further row of saw teeth. Or, in other words: the saw teeth are arranged with mirror symmetry in relation to a plane of symmetry that is normal to the longitudinal axis and that intersects the further row of saw teeth in its longitudinal centre. The aforementioned advantageous effects can thereby also be achieved in the set-back region. Owing to the fact that, however, the contribution of the further row of saw teeth is generally lessened (see above), at the same time the quality of cut can be improved at the reversal points (upper and lower dead points), or tearing can be avoided. In particular, tearing (with respect to the upward stroke (toward the reciprocating saw)) during sawing of thin workpieces, by the saw teeth of the further row of saw teeth (beyond the dividing plane, with respect to the reciprocating saw) that are adjacent to the second row of saw teeth, is thereby prevented. Insofar as these (critical) saw teeth emerge from the upper side of the workpiece during the upward stroke, their negative effect is lessened by the set-back (see above), but nevertheless the further region contributes to the progress of sawing, and allows gentle broaching of the workpiece (likewise positive for avoidance of tearing) at the turn points, or dead points or stroke reversal points.

Further, it is proposed that the saw teeth of the first and second row of saw teeth, in particular also the saw teeth of the further row of saw teeth, be arranged at least substantially with mirror symmetry in relation to the dividing plane, or plane of symmetry. The dividing plane, or plane of symmetry, is normal to the longitudinal axis of the reciprocating saw blade and intersects the further row of saw teeth in its longitudinal centre. "Substantially" means here, insofar as the longitudinal extent of the first and second row of saw teeth is identical. If, however, the longitudinal extent of the first and second row of saw teeth differs, the symmetry applies at least to identical distances with respect to the dividing plane. This allows simple production, for example as a result of only a single, simple resetting on the production machines.

It is proposed that the longitudinal extent of the second row of saw teeth be greater than or equal to the longitudinal extent of the first row of saw teeth, in particular greater by up to 50%, preferably greater by 15% to 35%. The longitudinal extent of the second row of saw teeth is, for example, 30 to 45 mm, in particular 41 mm, that of the first row of saw teeth, for example, 25 mm to 35 mm, in particular 30 mm. Typical workpiece thickness of up to 40 mm, or at least up to 30 mm, can thus be worked in an optimal manner, i.e. with little tearing.

It is additionally proposed that the longitudinal extent of the first or second row of saw teeth be 15% to 450% greater, in particular 30% to 85% greater, than the longitudinal extent of the further row of saw teeth. For example, the longitudinal extent of the first or second row of saw teeth is 10 mm to 26 mm, in particular 22.5 mm. This makes it possible, in the case of a stroke of a reciprocating saw of, for example, 26 mm and typical workpiece thicknesses of greater than a few millimetres, to ensure sufficient sawing progress and to prevent the first row of saw teeth, or saw teeth of the first row of saw teeth, from emerging from the lower workpiece surface (in the region of the lower dead point), and to prevent saw teeth of the second row of saw teeth from emerging from the upper workpiece surface (the workpiece surface facing toward the reciprocating saw; in the region of the upper dead point). The quality of cut is thereby improved.

The longitudinal extent of the further row of saw teeth is less than a stroke of a reciprocating saw intended for use of the reciprocating saw blade, in particular is 5% to 65% less, particularly preferably 10% to 15% less. As stated above, as a result the quality of cut is improved and tearing of workpieces, in particular from the upper and lower workpiece surface, is prevented.

It is additionally proposed that the saw teeth of the first and/or second and/or further row of saw teeth be profiled with a standard toothing or with a Japan toothing, in particular wherein they have no offset, or have an offset. This improves the sawing progress and/or the quality of cut.

Also claimed is a reciprocating saw having a reciprocating saw blade according to the disclosure.

BRIEF DESCRIPTION OF THE DRAWINGS

Further advantageous and expedient embodiments are given by the further claims, the description of the figures, and the figures that follow. There are shown:

DETAILED DESCRIPTION

Figure 1:
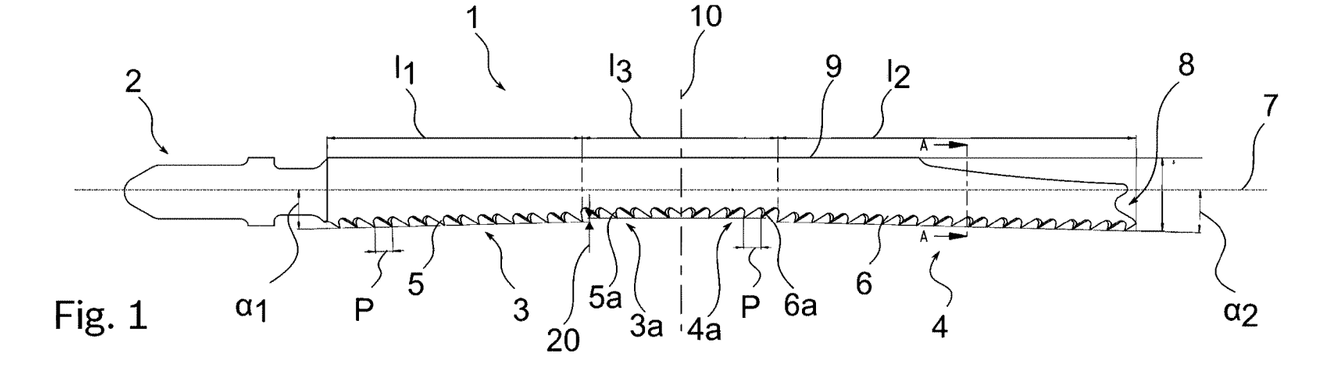
FIG. 1 a side view of the reciprocating saw blade according to the disclosure.

FIG. 1 shows a side view of a reciprocating saw blade 1 according to the disclosure, in the form of a jigsaw blade. The reciprocating saw blade 1 represented in FIG. 1 has a shank 2, via which the reciprocating saw blade 1 can be clamped into a machine-operated reciprocating saw, in particular a jigsaw (not represented). The shank 2 is a T-shank, but may also have other conventional or future shank shapes. On the reciprocating saw blade 1, first saw teeth 5 are distributed to a first row of saw teeth 3, which is adjacent to the shank 2, and second saw teeth 6 are distributed to a second row of saw teeth 4, which is adjacent to the tip 8 of the saw blade. In addition, further saw teeth 5a, 6a are distributed to a further row of saw teeth 3a, 4a, which is arranged between the first and the second row of saw teeth 3, 4. The further row of saw teeth 3a, 4a connects, as it were, a first portion to a second portion of a row of saw teeth, and itself constitutes a further portion of a row of saw teeth.

All three rows of saw teeth 3, 4, 3a, 4a are each arranged on straight lines. In particular, the saw tooth tips of the saw teeth 5, 6, 5a, 6a of the respective row of saw teeth 3, 4, 3a, 4a are each arranged on a straight line and/or saw-tooth tip plane that connects these saw tooth tips. The straight lines of the first and second row of saw teeth 3, 4 run transversely, or at an angle, to a longitudinal axis 7 of the reciprocating saw blade. The angles $\alpha_1$, $\alpha_2$ are each 1.5°, but differ in their preceding sign. The further row of saw teeth is oriented parallel to the longitudinal axis 7. The straight line of the further row of saw teeth 3a, 4a thus also runs parallel to the longitudinal axis 7 of the reciprocating saw blade 1. In order, with this definition, also to take account of an offset or a profiling of the saw teeth 5, 6, 5a, 6a, it could also be said, in other words, that the saw tooth tips of the respective rows of saw teeth 3, 4, 3a, 4a each lie in, or span, a common plane. A longitudinal extent $l_1$ of the first row of saw teeth 3 is about 20-40 mm, in particular 30 mm, a longitudinal extent $l_2$ of the second row of saw teeth 4 is about 25-45 mm, in particular 41 mm, and a longitudinal extent of the further row of saw teeth 3a, 4a is about 10-26 mm, in particular about 22.5 mm. In principle, however, it is also conceivable for the rows of saw teeth 3, 4, 3a, 4a to be of a convex or concave shape, or of a different type of shape.

The further row of saw teeth 3a, 4a, is set back, with respect to a longitudinal axis 7, in relation to the first and second row of saw teeth 3, 4, in particular is arranged in a step-wise set-back manner. The set-back 20 is effected in the respective region of transition of the first and second row of saw teeth 3, 4 to the further row of saw teeth 3a, 4a, respectively. In the case of the saw teeth 5, 6, 5a, 6a having a pitch P of about 2 mm, it is approximately 0.3-0.6 mm, in particular 0.5 mm.

The first saw teeth 5 of the first rows of saw teeth 3 are oriented toward the tip of the saw blade, and the second saw teeth 6 from the second row of saw teeth 4 are directed toward the shank 2 of the saw blade. This orientation of the first and second row of saw teeth 5, 6 defines a preferred direction of cut of the respective row of saw teeth 3, 4. The first row of saw teeth 3 is of a lesser length (here, approximately 20-30% shorter) than the second row of saw teeth 4, but in principle could also be of the same length or, preferably, in the case of an overall shorter reciprocating saw blade 1, could also be of a shorter length.

The further row of saw teeth 3a, 4a is divided centrally by a dividing plane 10 that runs transversely in relation to a longitudinal axis 7 of the reciprocating saw blade 1. The further saw teeth 5a of the further row of saw teeth 3a, 4a that are arranged on (left) side of the dividing plane 10 that faces toward the shank 2 are oriented in the direction of the tip 8 of the reciprocating saw blade 1; the further saw teeth 6a, arranged on the side that faces toward the tip 8, with respect to the dividing plane 10, are oriented in the direction of the shank 2. Thus, in the region of the dividing plane 10, there is a change of direction of the orientation of the further saw teeth 5a, 6a. The dividing plane 10 thus elucidates a transition of the orientation, between first and further saw teeth 5, 5a, which are oriented toward the tip 8, and second and further saw teeth 6, 6a, which are oriented toward the shank 2.

The longitudinal axis 7 of the reciprocating saw blade 1 at the same time corresponds to the basic stroke axis, or also direction of motion, of the reciprocating saw blade 1. The back 9 of the saw blade 1 is substantially parallel to the longitudinal axis 7. In principle, however, the back may also be at an angle in relation to the longitudinal axis 7 in order, for example, to produce or amplify a positive or negative oscillation in the stroke motion, and to produce effects, for example progressive (aggressive) or degressive cuts, known in the prior art. In the region of the tip 8, the back 9 tapers with respect to the longitudinal axis 7 the reciprocating saw blade 1, this corresponding to a typical design of a tip of a reciprocating saw blade 1 having effects known in the prior art. In addition, for production, the tip 8 has a recess, which is likewise typical for this component. Also thus included according to the disclosure are saw-blade back profiles (geometries), e.g. oblique in relation to the longitudinal axis 7 (increasing or decreasing in the direction of the tip 8 or of the shank 2 of the saw blade 1), as well as alternative geometries of the tip 8 or of the shank 2.

The first and second rows of saw teeth 3 and 4 are at an angle α1 and α2 respectively, differing in their preceding sign, relative to the longitudinal axis 7, or the stroke axis. The first and second row of saw teeth 3 and 4, respectively, are advantageously at the same angle, α1 and α2 respectively, differing in their preceding sign, relative to the longitudinal axis 7. In the exemplary embodiment, expediently, the angle α1 of the first row of saw teeth 3, adjacent to the shank 2, is positive, and the angle α2 of the second row of saw teeth 4, facing toward the tip 8, is negative. Typical values for the angles α1 and α2 of the first and second row of saw teeth 3, 4, respectively, are angular ranges of between 1° and 2°, and −1° and −2°, respectively, in particular 1.5° and −1.5°, respectively. The angles α1 and α2, respectively, are measured between the tooth tip line, which runs through the tooth tips of the respective saw teeth 5 and 6, respectively, and the longitudinal axis 7, or stroke axis. The further row of saw teeth 3a, 4a, on the other hand, is oriented parallel to the longitudinal axis 7. The set-back 20, toward the longitudinal axis 7, of all tooth tips of the further saw teeth 5a, 6a, or the distance from the longitudinal axis 7, is constant. Throughout, it is less than the distance of the tooth tips of the first and second saw teeth 5, 6 of the first and second row of saw teeth 3, 4 from the longitudinal axis 7.

In order to elucidate the angles α1 and α2 of the first and second rows of saw teeth 3, 4 and the angle-parallel alignment of the further row of saw teeth 3a, 4a with respect to the longitudinal axis 7, as well as the set-back 20, there is a (gradient) polygon represented in FIG. 1, directly beneath the jigsaw blade 1. The long base indicates a straight line parallel to the longitudinal axis 7; the slopes represents the straight lines of the first and second rows of saw teeth 3 and 4; the short connecting straight line represents the further row of saw teeth 3a, 4a. For reasons of greater clarity of representation, in the polygon the angles α1, between the first row of saw teeth 3 and the longitudinal axis 7, on the one hand, and α2, between the second row of saw teeth 4 and the longitudinal axis 7, on the other hand, are represented in an exaggerated manner. It becomes clear, however, that, on the one hand, the first and second row of saw teeth 3 and 4, respectively, enclose an angle with the longitudinal axis 7; the angles α1 and α2, having opposite preceding signs, are of equal magnitude; that, moreover, the further row of saw teeth 3a, 4a is oriented parallel to the longitudinal axis 7; and that the set-back 20 is effected in a step-wise manner.

Figure 2:
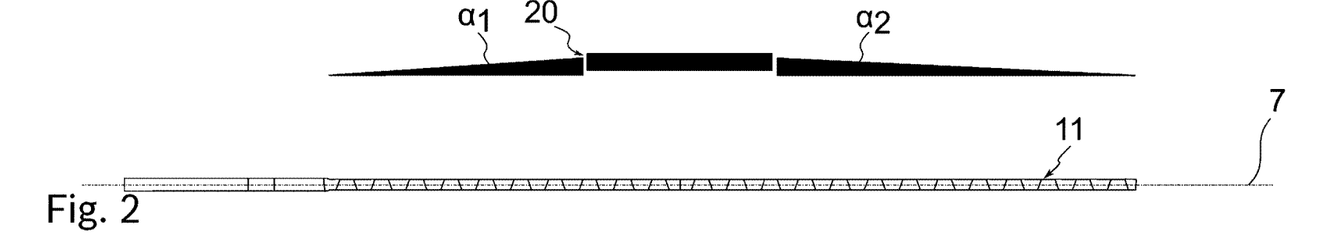
FIG. 2 the reciprocating saw blade in a view from below.
Figure 3:
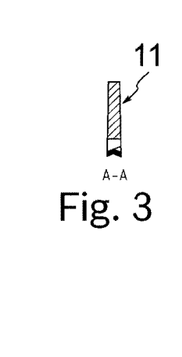
FIG. 3 a section according to section line A-A from FIG. 1.

As can be seen from the bottom view of the reciprocating saw blade 1 according to FIG. 2 and from the sectional representation of the reciprocating saw blade 1 according to FIG. 3, the first, second and further saw teeth 5, 6, 5a, 6a in the rows of saw teeth 3, 4, 3a, 4a are realized with a so-called offset, known to persons skilled in the art, which, however, is by no means essential. The flanks of the saw blade 1 are also profiled. The first, second and further rows of saw teeth 3, 4, 3a, 4a may also be realized without an offset, in which case the flanks then each lie in a plane with the lateral faces 11 of the reciprocating saw blade 1; none of the saw teeth of the reciprocating saw blade 1 then projects over, or breaches, this plane.

Figure 4:
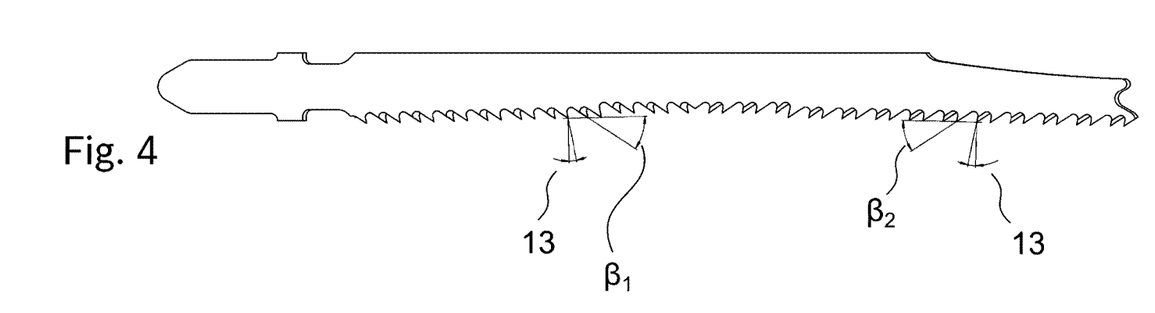
FIG. 4 a perspective representation of the saw blade, with indicated rake angles and relief angles of the saw teeth, FIG. 5 an enlarged representation of FIG. 1, in particular of the further row of saw teeth with adjoining first and second row of saw teeth, FIG. 6 an exemplary, alternative embodiments of the toothing, or of the saw teeth and of the saw blade, FIG. 7 a schematic representation of the reciprocating saw blade in an upper and a lower dead point, or turning point, with a workpiece.

Furthermore, FIG. 4 shows the relief angle β1 and β2, respectively, of the first, second and further saw teeth 5, 5a and 6, 6a, and the rake angle 13. The latter, also, in a manner similar to the orientation of the saw teeth explained above, changes in its preceding sign, or its orientation, with respect to the longitudinal axis 7 at the dividing plane 10. It is +35° and −35°, respectively. In principle, the relief angle β1 of the first and/or further saw teeth 5, 5a, on the side toward the shank 2 of the dividing plane 10, and the relief angle β2 of the second and/or further saw teeth 6, 6a, on the side toward the tip 8 of the dividing plane 10, may also differ in magnitude. It could be provided, for example, that the relief angle β1, β2 of the first and second saw teeth 5, 6 is approximately 10-70% greater, in particular 50% greater, than the relief angle β1, β2 of the further saw teeth 5a, 6a, such that there would thus be a discontinuity in the magnitude of the relief angle β1, β2 in the transition region mentioned above. Here, by way of example, the rake angle is about 10°.

Figure 5:
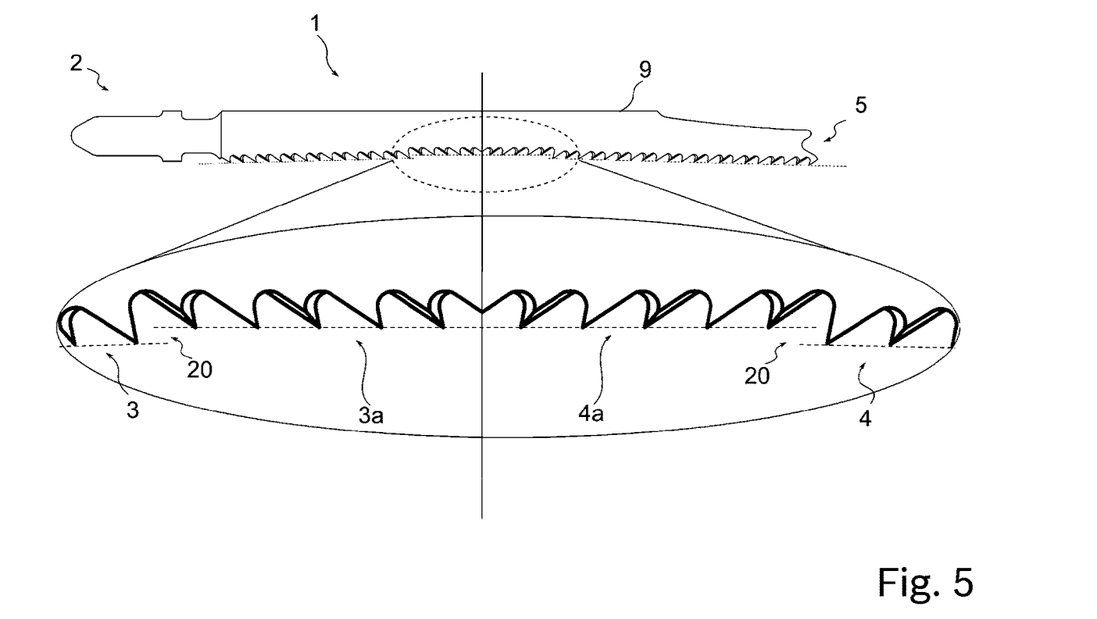

FIG. 5 shows an enlarged representation of the set-back 20 of the saw blade from FIG. 1.

Figure 6:
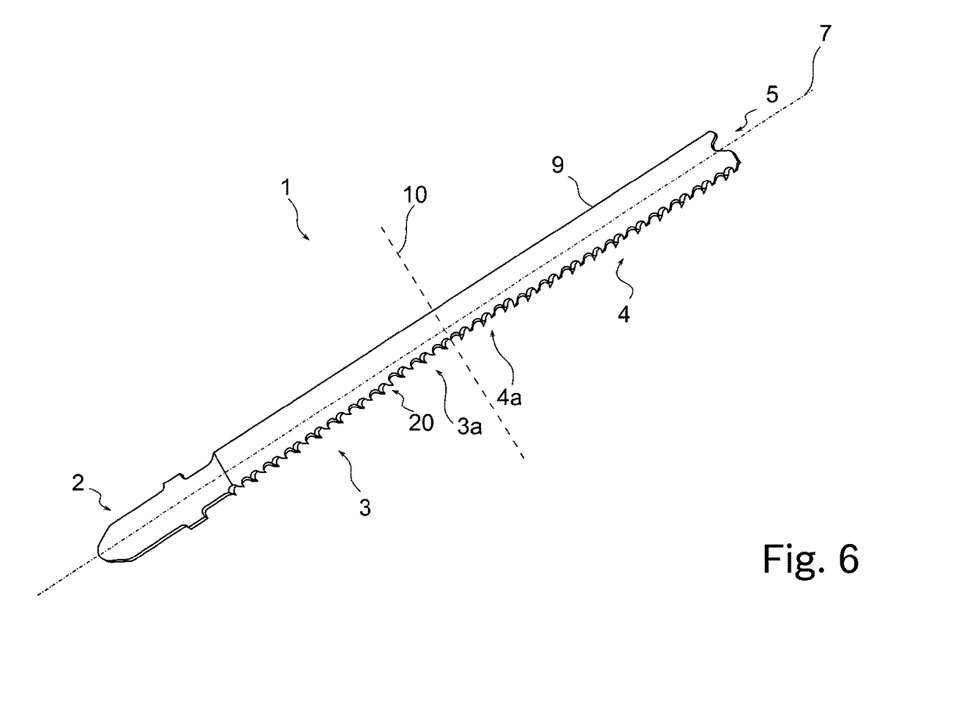

FIG. 6 shows an alternative reciprocating saw blade 1 according to the disclosure, having a Japan toothing, whereas FIGS. 1 to 5 have a standard toothing. In addition, the geometry of the back differs. Moreover, the width of the saw blade is less in the region of the dividing plane, such that it is particularly suitable for curved cuts. It is understood that differing geometries of the saw blade, in particular of the shank, back, tip and/or toothing types may be combined in any manner. Elements that are the same or similar are denoted by the same references as in FIGS. 1-5.

Figure 7:
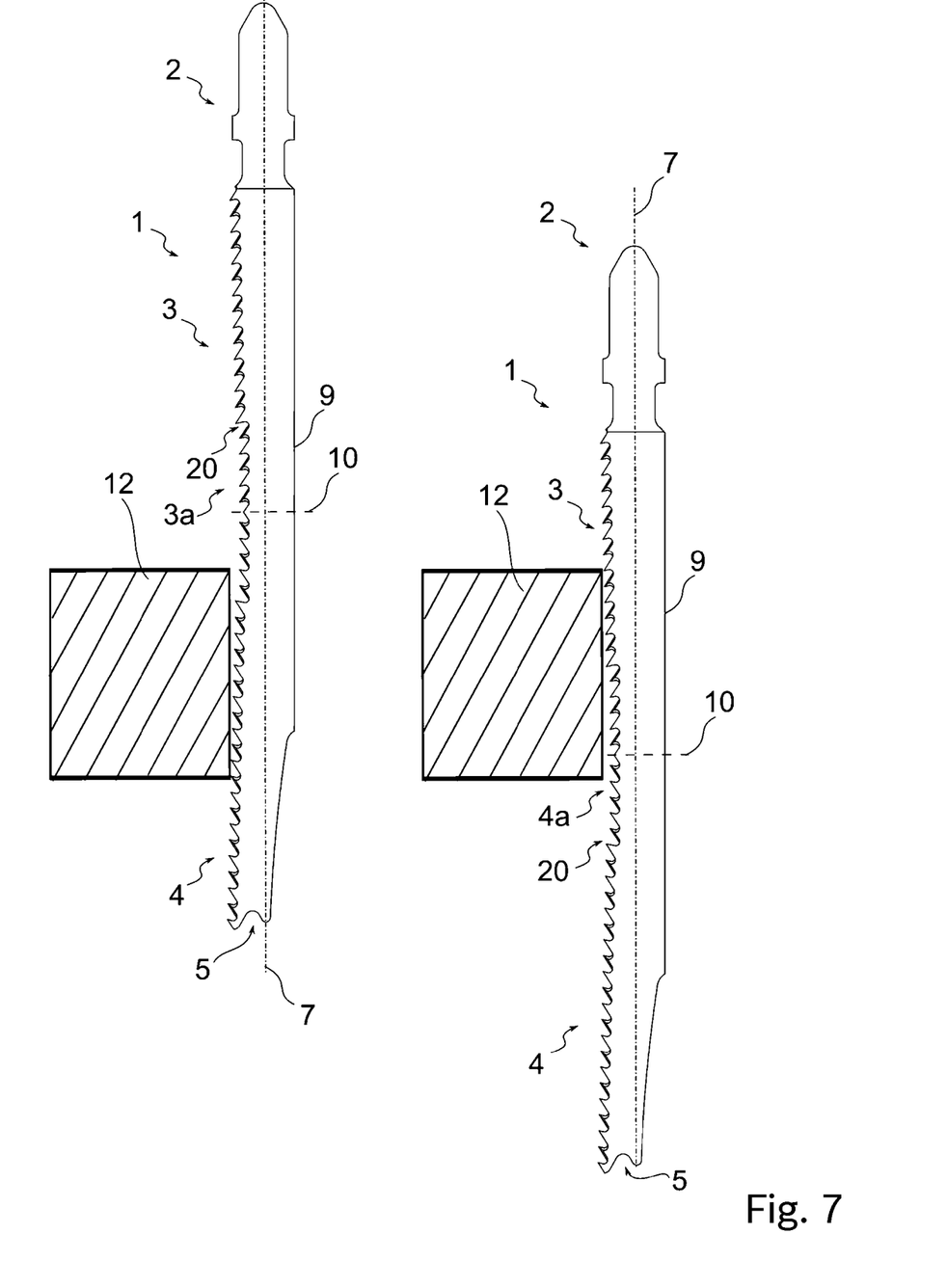

FIG. 7 shows the reciprocating saw blade 1 according to FIGS. 1 to 5 during the performing of work on a workpiece 12, represented schematically, in the region of an upper reversal point, or dead point (left), and in the region of a lower reversal point, or dead point (right).

The invention claimed is:

1. A reciprocating saw blade for a power tool, comprising:
   a first row of saw teeth having a first angle with respect to a longitudinal axis of the reciprocating saw blade;
   a second row of saw teeth having a second angle with respect to the longitudinal axis, the first angle of the first row of saw teeth oriented oppositely to the second angle of the second row of saw teeth; and
   a further row of saw teeth arranged longitudinally between the first and second rows of saw teeth,
   wherein the further row of saw teeth is set back toward the longitudinal axis relative to the first and second rows of saw teeth such that a first tooth of the further row of saw teeth that is adjacent to the first row is set back toward the longitudinal axis from a longitudinal extension of a first profile of tooth tips of the first row of saw teeth, and a second tooth of the further row of saw teeth that is adjacent to the second row is set back toward the longitudinal axis from a longitudinal extension of a second profile of tooth tips of the second row of saw teeth, and
   wherein the set back of the first tooth and the set back of the second tooth are between 10% and 35% of a pitch of teeth of one or more of the first row of saw teeth, the second row of saw teeth, and the further row of saw teeth.

2. The reciprocating saw blade as claimed in claim 1, wherein the further row of saw teeth is arranged on a straight line.

3. The reciprocating saw blade as claimed in claim 2, wherein the straight line on which the further row of saw teeth is arranged is parallel to the longitudinal axis.

4. The reciprocating saw blade as claimed in claim 1, wherein the first and second rows of saw teeth are each arranged on a straight line.

5. The reciprocating saw blade as claimed in claim 1, wherein the first and second rows of saw teeth have opposing directions of cutting.

6. The reciprocating saw blade as claimed in claim 1, wherein the further row of saw teeth has a first set of saw teeth configured for cutting in a first direction, and a second set of saw teeth configured for cutting in a second opposite direction.

7. The reciprocating saw blade as claimed in claim 6, wherein the saw teeth of the further row of saw teeth are arranged with mirror symmetry in relation to a plane of symmetry that is normal to the longitudinal axis and that intersects the further row of saw teeth in its longitudinal centre.

8. The reciprocating saw blade as claimed in claim 1, wherein the saw teeth of the first and second rows of saw teeth are arranged at least substantially with mirror symmetry in relation to a plane of symmetry that is normal to the longitudinal axis of the reciprocating saw blade and that intersects the further row of saw teeth in its longitudinal center.

9. The reciprocating saw blade as claimed in claim 8, wherein the saw teeth of the first and second rows of saw teeth and the saw teeth of the further row of saw teeth are arranged at least substantially with mirror symmetry in relation to the plane of symmetry.

10. The reciprocating saw blade as claimed in claim 1, wherein the longitudinal extent of the second row of saw teeth is greater than or equal to the longitudinal extent of the first row of saw teeth.

11. The reciprocating saw blade as claimed in claim 10, wherein the longitudinal extent of the second row of saw teeth is greater than the longitudinal extent of the first row of saw teeth by 30% to 35%.

12. The reciprocating saw blade as claimed in claim 1, wherein the longitudinal extent of the first row of saw teeth or the second row of saw teeth is 15% to 450% greater than the longitudinal extent of the further row of saw teeth.

13. The reciprocating saw blade as claimed in claim 1, wherein a third profile of tooth tips of the further row of saw teeth is set back in a stepwise manner toward the longitudinal axis relative to the first and second profiles.

14. The reciprocating saw blade as claimed in claim 1, wherein the set back of the first tooth and the set back of the second tooth are 25% of the pitch of the teeth of the one or more of the first row of saw teeth, the second row of saw teeth, and the further row of saw teeth.

15. The reciprocating saw blade as claimed in claim 1, wherein the saw teeth of the one or more of the first row of saw teeth, the second row of saw teeth, and the further row of saw teeth have no offset.

16. The reciprocating saw blade as claimed in claim 1, wherein the saw teeth of the one or more of the first row of saw teeth, the second row of saw teeth, and the further row of saw teeth have an offset.

17. The reciprocating saw blade as claimed in claim 1, wherein a third profile of tooth tips of the further row of saw teeth is discontinuous from the first and second profiles at the respective first and second teeth.

18. A reciprocating saw, comprising:
   a reciprocating saw blade that includes:
      a first row of saw teeth having a first angle with respect to a longitudinal axis of the reciprocating saw blade,
      a second row of saw teeth having a second angle with respect to the longitudinal axis, the first angle of the first row of saw teeth oriented oppositely to the second angle of the second row of saw teeth, and
      a further row of saw teeth arranged longitudinally between the first and second rows of saw teeth,
   wherein the further row of saw teeth is set back toward the longitudinal axis relative to the first and second rows of saw teeth such that a first tooth of the further row of saw teeth that is adjacent to the first row is set back toward the longitudinal axis from a longitudinal extension of a first profile of tooth tips of the first row of saw teeth, and a second tooth of the further row of saw teeth that is adjacent to the second row is set back toward the longitudinal axis from a longitudinal extension of a second profile of tooth tips of the second row of saw teeth, and
   wherein the set back of the first tooth and the set back of the second tooth are between 10% and 35% of a pitch of teeth of one or more of the first row of saw teeth, the second row of saw teeth, and the further row of saw teeth.

19. The reciprocating saw as claimed in claim 18, wherein the longitudinal extent of the further row of saw teeth is less than a stroke of the reciprocating saw.

* * * * *

UNITED STATES PATENT AND TRADEMARK OFFICE
CERTIFICATE OF CORRECTION

PATENT NO. : 11,253,936 B2
APPLICATION NO. : 16/487263
DATED : February 22, 2022
INVENTOR(S) : Kocher et al.

It is certified that error appears in the above-identified patent and that said Letters Patent is hereby corrected as shown below:

On the Title Page

On Page 2, item [56]:
Line 4, "GN" should read --CN--.
Line 5, "GN" should read --CN--.
Line 6, "GN" should read --CN--.

Signed and Sealed this
Twenty-eighth Day of June, 2022

Katherine Kelly Vidal
*Director of the United States Patent and Trademark Office*